United States Patent [19]
Aoki

[11] Patent Number: 6,145,875
[45] Date of Patent: Nov. 14, 2000

[54] IGNITER FOR AIR BAG

[75] Inventor: Hiroshi Aoki, Tokyo, Japan

[73] Assignee: Takata Corporation, Tokyo, Japan

[21] Appl. No.: 09/209,042

[22] Filed: Dec. 10, 1998

[30] Foreign Application Priority Data

Dec. 22, 1997 [JP] Japan ................................ 9-353177

[51] Int. Cl.⁷ ........................................... B60R 21/32
[52] U.S. Cl. ..................................................... 280/735
[58] Field of Search .............................. 280/735; 701/35; 307/10.1

[56] References Cited

U.S. PATENT DOCUMENTS

| | | | |
|---|---|---|---|
| 5,046,149 | 9/1991 | Nunan ........................... | 307/10.1 |
| 5,194,755 | 3/1993 | Rhee et al. .................... | 307/10.1 |
| 5,261,694 | 11/1993 | White et al. ................... | 280/735 |
| 5,522,617 | 6/1996 | Swart ........................... | 280/735 |
| 5,554,890 | 9/1996 | Kinoshita ...................... | 307/10.1 |
| 5,936,313 | 9/1999 | Cook, Jr. et al. ............... | 307/10.1 |
| 5,957,988 | 9/1999 | Osajda et al. .................. | 701/45 |
| 5,977,651 | 11/1999 | Ueda et al. .................... | 307/10.1 |
| 5,999,871 | 12/1999 | Liu .............................. | 701/45 |

FOREIGN PATENT DOCUMENTS

| | | | |
|---|---|---|---|
| 0 338 413 | 10/1989 | European Pat. Off. ............. | 307/10.1 |
| 0 339 967 | 11/1989 | European Pat. Off. ............. | 307/10.1 |
| 2 300 955 | 11/1996 | United Kingdom ................. | 307/10.1 |

*Primary Examiner*—J. J. Swann
*Assistant Examiner*—J. Allen Shriver
*Attorney, Agent, or Firm*—Kanesaka & Takeuchi

[57] ABSTRACT

An igniter for an air bag device includes first and second backup power circuits having first and second condensers, respectively, the first condenser having a capacity greater than that of the second condenser, a first ignition device formed of a first squib and a first ignition switch connected in series, a second ignition device formed of a second squib and a second ignition switch connected in series, and a control device connected to the first and second ignition switches and the operating switch for actuating the switches upon receiving an operation signal from a vehicle. Upon receiving the operation signal, the control device actuates firstly the first ignition switch to actuate the first squib by the first condenser of the first backup circuit, and after a predetermined time, secondly the second ignition switch and the operating switch to actuate the second squib by the first and second condensers of the first and second backup circuits. Thus, the capacity of the second condenser can be lowered.

8 Claims, 2 Drawing Sheets

IGNITER FOR AIR BAG

FIELD OF THE INVENTION

The present invention relates to an igniter for an air bag device for protecting an occupant of a vehicle and, more particularly, to an igniter for igniting and activating a plurality of inflators with predetermined delay time periods.

DESCRIPTION OF PRIOR ART

An igniter is disclosed in Japanese patent application 7-257315A which ignites a plurality of inflators with predetermined delay time periods. In the igniter disclosed in this publication (as shown in, for example, FIG. 3 of the publication), voltage of a battery is boosted and charged in three, first through third, backup condensers. The first condenser is connected to a first squib via a first transistor system, the second condenser is connected to a second squib via a second transistor system, and the third condenser is connected to a third squib via a third transistor system. Earth terminals of the first through third squibs are earthed through a common safing sensor.

When collision of a vehicle is decided on the basis of acceleration from an acceleration sensor, the first through third transistor systems are switched "ON" with delay time periods so that the first through third squibs start ignition with delay time periods.

In the above conventional igniter, since one condenser is provided for one squib, each condenser is required to have capacity enough for securely activating each squib.

OBJECT AND SUMMARY OF THE INVENTION

It is an object of the present invention to provide an igniter for an air bag which, in case of a plurality of, first through n-th, squibs and condensers, enables the miniaturization of each capacity of the second through n-th condensers.

An igniter for an air bag device of the present invention comprises first through n-th backup power circuits each having a condenser which is charged by a battery provided in a vehicle, first through n-th squibs, and a controller which controls current to be supplied sequentially to the first through n-th squibs from one or more of the backup power circuits. The controller controls the current supply to the first squib so that it is conducted only by the first backup power circuit. The controller controls the current supply to the m-th ($2 \leq m \leq n$) squib so that it is conducted by at least two of the first through m-th backup power circuits. The controller may control the current supply of the m-th squib so that it is conducted by all of the first though m-th backup power circuits.

In one of embodiments, m and n are 2, and the second squib is fed the current by the first and second backup power circuits.

In another embodiment, n is 3. The second squib is fed the current by the first and second backup power circuits, and the third squib is fed the current by the second and third backup power circuits.

In further another embodiment, n is 3. The second squib is fed the current by the first and second backup power circuits, and the third squib is fed the current by the first, second, and third backup power circuits.

The current supply to each squib is controlled by the controller. The current supply to each squib may be conducted through each ignition switch.

A safing switch may be provided between the ignition switches and the backup power circuits. The safing switch is turned "on" when the vehicle comes into collision.

In the igniter for an air bag of the present invention, though the first backup power circuit is required to have enough capacity for securely activating the first squib, the second to the last squibs can be ignited by utilizing the residual charge of the condenser of the former backup power circuit including the first backup power circuit. Each condenser of the second through the last backup power circuits is enough to have small capacity.

DETAILED DESCRIPTION OF PREFERRED EMBODIMENTS

Figure 1:
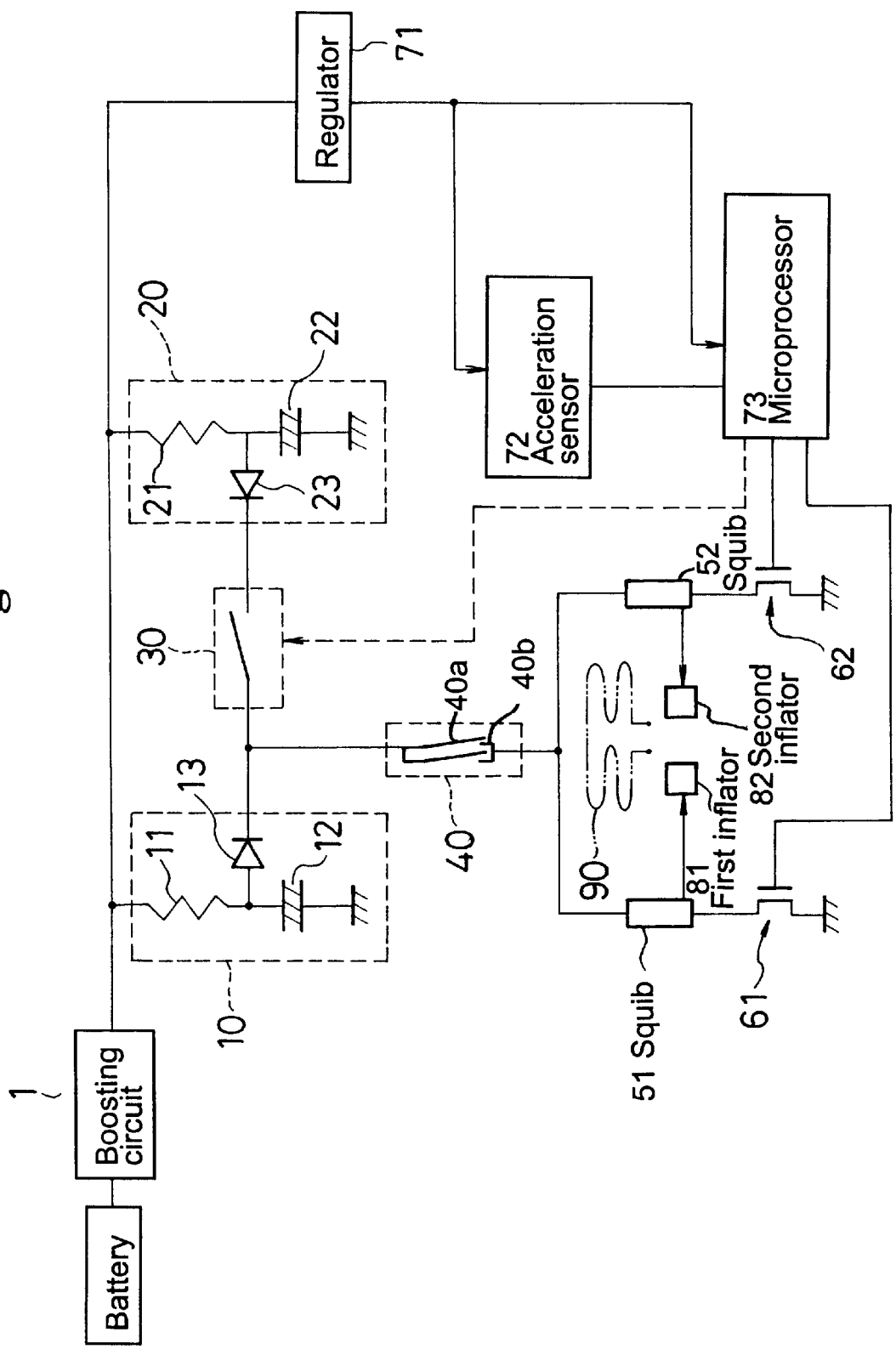
FIG. 1 is a circuit diagram of an igniter for an air bag according to an embodiment.

FIG. 1 is a circuit diagram of an igniter for an air bag according to an embodiment.

A power voltage provided from a battery source in a vehicle is boosted by a boosting circlet 1 and charged in condensers 12, 22 of a first backup power circuit 10 and a second backup power circuit 20. Reference numerals 11, 21 designate resistors for preventing the rush current.

A non-earthed terminal of the condenser 12 of the first backup power circuit 10 is connected to one end of safing sensor or switch 40 via a reverse-current braking diode 13 and a non-earthed terminal of the condenser 22 of the second backup power circuit 20 is connected to the end of the safing sensor 40 via a reverse-current braking diode 23 and a switch 30. The safing sensor 40 has operational function that, in the event of a vehicle collision or rolling-over i.e. air bag operation condition, a movable piece 40a comes in contact with a contact 40b whereby the safing sensor 40 is turned "on".

The other end of the safing sensor 40 is connected to the respective ends of the first and second squibs 51, 52. The other end of the squib 51 is earthed through a first ignition switch 61 and the other end of the squib 52 is earthed through a second ignition switch 62. The ignition switch 61, 62 are transistors including field effect transistors similar to the switch 30.

The output end of the boosting circuit 1 is connected to a regulator 71 in addition to the backup power circuits 10, 20. The constant-voltage output end of the regulator 71 is connected to an acceleration sensor 72 and a microprocessor 73. A detection signal of the acceleration sensor 72 is inputted into the microprocessor 73, whereas the microprocessor 73 activates the ignition switches 61, 62.

The first squib 51 activates a first inflator 81 and the second squib 52 activates a second inflator 82. The first and second inflators 81, 82 generate gas into a common air bag 90 to inflate it. As described later, the first inflator 81 is first activated to inflate the air bag 90 with gas at a lower pressure and, after that, the second inflator 82 is activated to inflate the air bag 90 sufficiently and largely.

That is, when, in the event of a vehicle collision, the safing sensor 40 is turned "on" and the microprocessor 73 decides occurrence of collision on the basis of a signal from the acceleration sensor 72, the microprocessor 73 turns on the first ignition switch 61 only for a predetermined time period. Therefore, the condenser 12 supplies current to the squib 51 so that the first inflator 81 generates and jets gas.

After a predetermined time period, the microprocessor 73 turns on the second ignition switch 62 and closes the switch 30. Therefore, the current supply to the second squib 52 is conducted by charge of the second condenser 22 and residual charge of the first condenser 12, so the second inflator 82 generates and jets gas.

In this manner, the second squib 52 is fed current not only from the condenser 22 but also from the condenser 12, thereby enabling the reduction in the capacity of the condenser 22 of the second backup power circuit 20.

In this embodiment, since the input side of the regulator 71 is connected to the backup power circuits 10, 20, even when the current supply from the battery and/or the boosting circuit 1 is stopped, the regulator 71 can supply constant-voltage output to the acceleration sensor 72 and the microprocessor 73 by virtue of current supply from the condensers 12, 22.

In this embodiment, since the two squibs 51, 52 are connected to the common safing sensor 40, only one safing sensor 40 is enough.

The circuit shown in FIG. 1 may be composed of the following circuit parts, but this is just an example, and it should be noted that other pats may be employed.

| Register 11 | 150 Ω |
|---|---|
| Register 21 | 150 Ω |
| Condenser 12 | 2200 ΩF |
| Condenser 22 | 2200 ΩF |
| Safing sensor 40 | Availabable from Hamurin Corporation |
| Squib 51 | Available from DEA |
| Regulator 71 | Declared Power 5 V |
| Acceleration Sensor 72 | Available from Motorola |
| Microprocessor 73 | Available from Motorola |

Though the safing sensor 40 is disposed between the squibs 51, 52 and the condensers 12, 22 in the above embodiment, the earthed terminals of the ignition switches 61, 62 may be connected to a common terminal and the safing sensor may be disposed between the common terminal and the earth.

Figure 2:
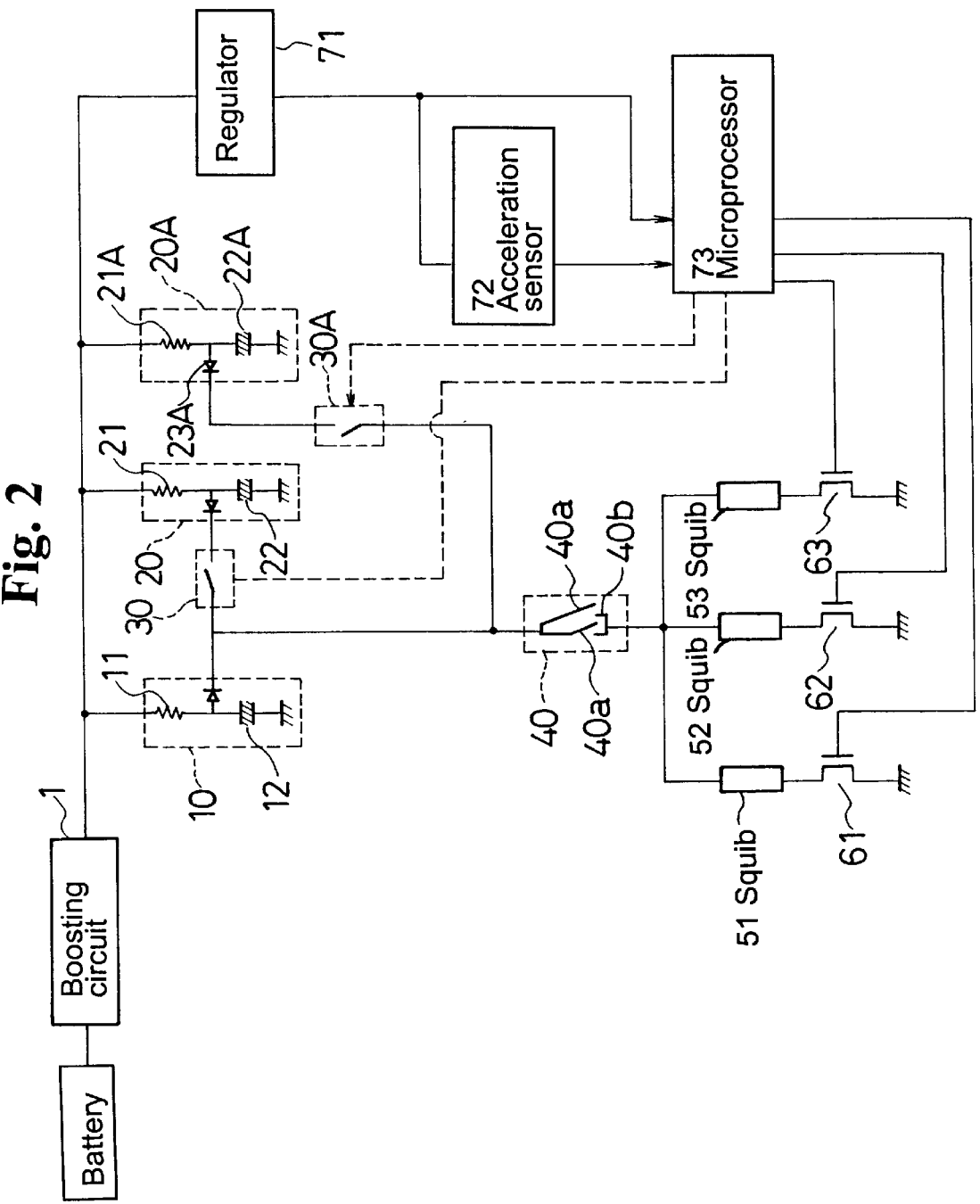
FIG. 2 is a circuit diagram of an igniter for an air bag according to another embodiment.

FIG. 2 is a circuit diagram of an igniter which is provided with a third backup power circuit 20A, a switch 30A, a third squib 53, and a third ignition switch 63 in addition to the igniter shown in FIG. 1. Numeral 21A designates a resistor, 22A designates a condenser, and 23A designates a diode.

In the same manner as the case shown in FIG. 1, the switches 30, 30A are open for supplying current to the first squib 51. The switch 30 is closed and only the switch 30A is open for supplying current to the second squib 52. Both the switches 30, 30A are closed for supplying current to the third squib 53. Therefore, the current supply to the second squib 52 is conducted by the condensers 12, 22 and the current supply to the third squib 53 is conducted by the condensers 12, 22, 22A. Accordingly, as the condenser 22A for the third backup power circuit 20A, a condenser of small capacity is enough.

The present invention can be applied to a case having four or more squibs and four or more backup power circuits. It should be understood by one of skilled persons in the art that the four or more squibs and the four or more backup power circuits are arranged in parallel, respectively, in the same manner as shown in FIG. 2.

In this case, it is preferable that the current supply to the m-th squib is conducted by all of condensers of the first through m-th backup power circuits. However, the current supply may be conducted by some but two or more of the condensers of the first through m-th backup power circuits.

As mentioned above, the igniter for an air bag of the present invention enables the miniaturization of the capacity of condensers of backup power circuits. Also in the present invention, only one safing sensor is enough.

What is claimed is:

1. An igniter for an air bag device comprising:

first and second backup power circuits having first and second condensers, respectively, adapted to be charged by a battery provided in a vehicle, said first condenser having a capacity greater than that of the second condenser, a first ignition device formed of a first squib and a first ignition switch connected in series, a second ignition device formed of a second squib and a second ignition switch connected in series, a first connection member connecting the first ignition device to the first backup circuit, a second connection member connecting the second ignition device to the first and second backup circuits, an operating switch situated in the second connection member, and control means connected to the first and second ignition switches and the operating switch for controlling the switches upon receiving an operation signal from a vehicle, said control means, upon receiving the operation signal, actuating firstly the first ignition switch to actuate the first squib by the first condenser of the first backup circuit and after a predetermined time, actuating secondly the second ignition switch and the operating switch to actuate the second squib by the first and second condensers of the first and second backup circuits.

2. An igniter as claimed in claim 1, further comprising a safing sensor connected to the first and second connection members for sensing an air bag operating condition, said safing sensor closing the first and second connection members upon detection of the air bag operating condition.

3. An igniter as claimed in claim 2, wherein said first and second connection members have a common portion, in which the safing sensor is disposed.

4. An igniter as claimed in claim 3, wherein said control means includes an acceleration sensor for sensing the air bag operating condition.

5. An igniter as claimed in claim 1, further comprising:

at least one third backup power circuit having a third condenser with a capacity less than that of the first condenser, at least one third ignition device formed of a third squib and a third ignition switch connected in series, said third ignition switch being connected to the control means, at least one third connection member connecting the at least one third ignition device to the at least one third back power circuit and at least one of the first and second backup circuits, and at least one second operating switch situated in the at least one third connection member so that after a predetermined time upon actuation of the second squib, the control means operates the third ignition switch and the at least one second operating switch to actuate the third squib by the third condenser and at least one of the first and second condensers of the first and second backup circuits.

6. An igniter as claimed in claim 5, wherein when the third squib is actuated, the first to third condensers provide current to actuate the third squib.

7. An igniter as claimed in claim 1, wherein the squibs actuate respective inflators.

8. An igniter as claimed in claim 7, wherein said inflators inflate one air bag sequentially.

* * * * *